United States Patent
Apodaca

[19]

[11] Patent Number: 5,649,744
[45] Date of Patent: Jul. 22, 1997

[54] OPERATOR SEAT HARNESS

[76] Inventor: Ron Apodaca, 824 W. 9th St., San Pedro, Calif. 90731

[21] Appl. No.: 631,981

[22] Filed: Apr. 15, 1996

[51] Int. Cl.⁶ .............. A47D 15/00; A62B 35/00; B60R 21/02; B60R 22/12
[52] U.S. Cl. .............................. 297/485; 297/484
[58] Field of Search .................. 297/485, 468, 297/484

[56] References Cited

U.S. PATENT DOCUMENTS

| | | | |
|---|---|---|---|
| 1,298,615 | 3/1919 | Wilkinson | 297/485 X |
| 1,316,163 | 9/1919 | Kennedy | 297/485 |
| 1,898,090 | 2/1933 | Lethem | 297/484 |
| 3,321,247 | 5/1967 | Dillender | 297/484 X |
| 3,385,633 | 5/1968 | Aizley | 297/484 X |
| 3,428,029 | 2/1969 | Klickstein et al. | 297/484 |
| 4,205,670 | 6/1980 | Owens | 297/485 X |
| 4,226,474 | 10/1980 | Rupert et al. | 297/484 |
| 4,488,691 | 12/1984 | Lorch | 297/484 X |
| 4,632,425 | 12/1986 | Barratt | 297/485 X |
| 4,709,966 | 12/1987 | Parkinson et al. | 297/484 X |
| 4,927,211 | 5/1990 | Bolcerek | 297/484 X |
| 5,215,354 | 6/1993 | Grene | 297/485 |
| 5,226,698 | 7/1993 | Harrison | 297/485 |
| 5,301,371 | 4/1994 | Chao | 297/468 X |
| 5,378,046 | 1/1995 | Gordy et al. | 297/485 |
| 5,435,272 | 7/1995 | Epstein | 297/484 X |
| 5,499,860 | 3/1996 | Smith et al. | 297/485 X |

*Primary Examiner*—Milton Nelson, Jr.
*Assistant Examiner*—Rodney B. White

[57] ABSTRACT

An operator seat harness for supporting an operator relative to a seat. The device includes a pair of torso straps which can be secured to a back of an operator's seat of a crane or the like. A pair of shoulder straps are movably coupled to the torso straps and can also be secured to the back of the seat. The straps are operable to extend about an operator of the crane to support the operator relative to the seat to reduce fatigue and promote operator comfort.

1 Claim, 3 Drawing Sheets

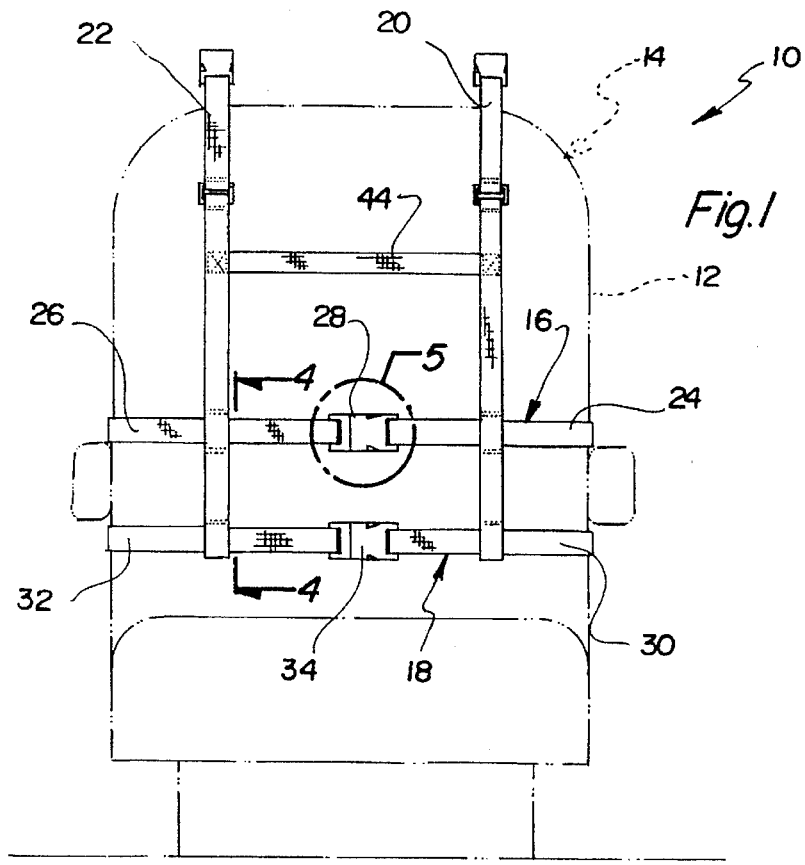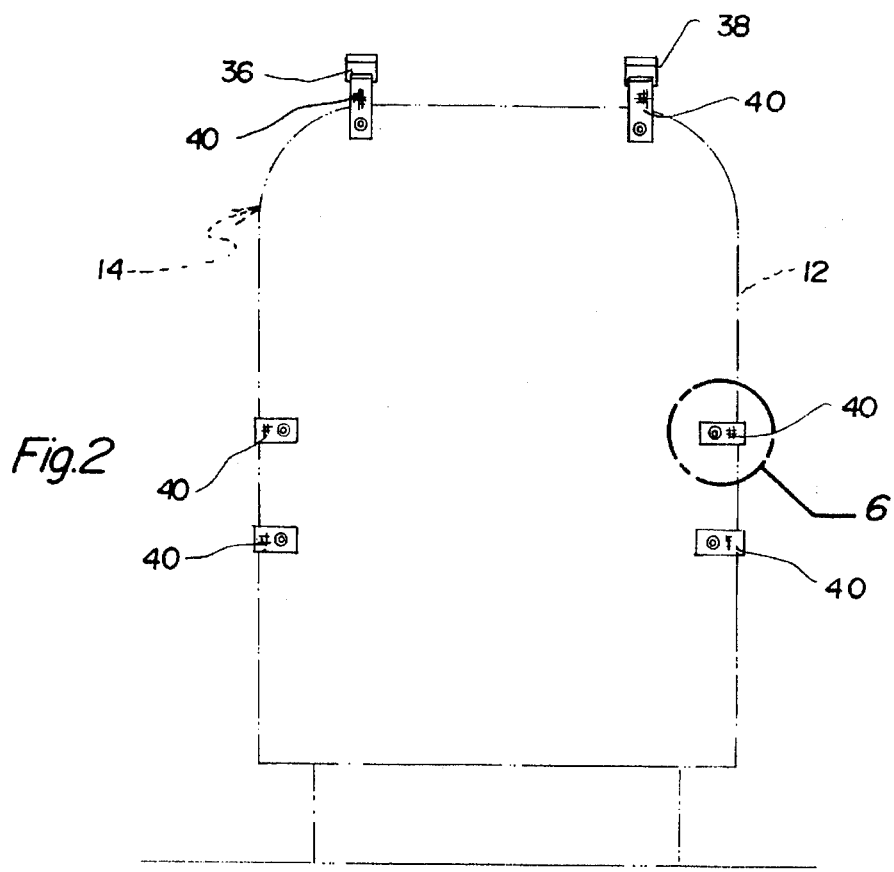

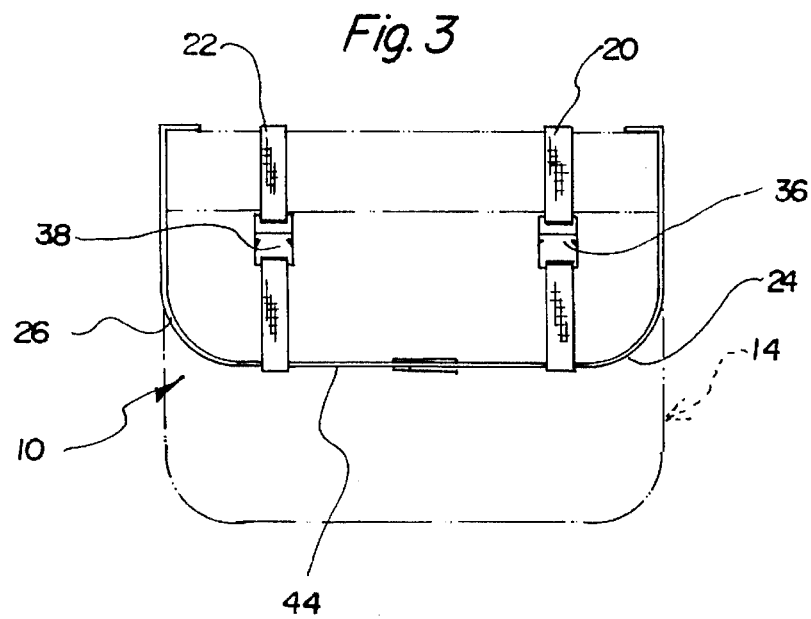
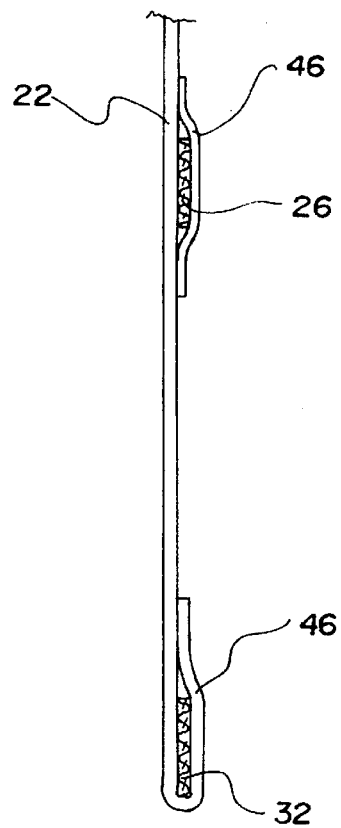

5,649,744

1

OPERATOR SEAT HARNESS

BACKGROUND OF THE INVENTION

1. Field of the Invention

The present invention relates to seat restraints and more particularly pertains to an operator seat harness for supporting an operator relative to a seat.

2. Description of the Prior Art

The use of seat restraints is known in the prior art. More specifically, seat restraints heretofore devised and utilized are known to consist basically of familiar, expected and obvious structural configurations, notwithstanding the myriad of designs encompassed by the crowded prior art which have been developed for the fulfillment of countless objectives and requirements.

Known prior art seat restraints include U.S. Pat. No. 4,090,735; U.S. Pat. No. 5,287,943; U.S. Pat. No. 5,220,976; U.S. Pat. No. 5,052,514; U.S. Pat. No. 5,316,102; and U.S. Design Pat. No. 309,359.

While these devices fulfill their respective, particular objectives and requirements, the aforementioned patents do not disclose an operator seat harness for supporting an operator relative to a seat which includes a pair of torso straps which can be secured to a back of an operator's seat of a crane or the like; and a pair of shoulder straps movably coupled to the torso straps which can also be secured to the back of the seat, wherein the straps are operable to extend about an operator of the crane to support the operator relative to the seat to reduce fatigue and promote operator comfort.

In these respects, the operator seat harness according to the present invention substantially departs from the conventional concepts and designs of the prior art, and in so doing provides an apparatus primarily developed for the purpose of supporting an operator relative to a seat.

SUMMARY OF THE INVENTION

In view of the foregoing disadvantages inherent in the known types of seat restraints now present in the prior art, the present invention provides a new operator seat harness construction wherein the same can be utilized for supporting an operator relative to a seat. As such, the general purpose of the present invention, which will be described subsequently in greater detail, is to provide a new operator seat harness apparatus and method which has many of the advantages of the seat restraints mentioned heretofore and many novel features that result in an operator seat harness which is not anticipated, rendered obvious, suggested, or even implied by any of the prior art seat restraints, either alone or in any combination thereof.

To attain this, the present invention generally comprises an operator seat harness for supporting an operator relative to a seat. The inventive device includes a pair of torso straps which can be secured to a back of an operator's seat of a crane or the like. A pair of shoulder straps are movably coupled to the torso straps and can also be secured to the back of the seat. The straps are operable to extend about an operator of the crane to support the operator relative to the seat to reduce fatigue and promote operator comfort.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

2

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new operator seat harness apparatus and method which has many of the advantages of the seat restraints mentioned heretofore and many novel features that result in an operator seat harness which is not anticipated, rendered obvious, suggested, or even implied by any of the prior art seat restraints, either alone or in any combination thereof.

It is another object of the present invention to provide a new operator seat harness which may be easily and efficiently manufactured and marketed.

It is a further object of the present invention to provide a new operator seat harness which is of a durable and reliable construction.

An even further object of the present invention is to provide a new operator seat harness which is susceptible of a low cost of manufacture with regard to both materials and labor, and which accordingly is then susceptible of low prices of sale to the consuming public, thereby making such operator seat harnesses economically available to the buying public.

Still yet another object of the present invention is to provide a new operator seat harness which provides in the apparatuses and methods of the prior art some of the advantages thereof, while simultaneously overcoming some of the disadvantages normally associated therewith.

Still another object of the present invention is to provide a new operator seat harness for supporting an operator relative to a seat.

Yet another object of the present invention is to provide a new operator seat harness which includes a pair of torso straps which can be secured to a back of an operator's seat of a crane or the like; and a pair of shoulder straps movably coupled to the torso straps which can also be secured to the back of the seat, wherein the straps are operable to extend about an operator of the crane to support the operator relative to the seat to reduce fatigue and promote operator comfort.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the preferred embodiment of the operator seat harness constructed in accordance with the principles of the present invention.

FIG. 2 is a rear elevational view of the present invention.

FIG. 3 is a top plan view of the invention.

FIG. 4 is a cross sectional view taken along line 4—4 of FIG. 1.

Similar reference characters refer to similar parts throughout the several views of the drawings.

DESCRIPTION OF THE PREFERRED EMBODIMENT

Figure 5:
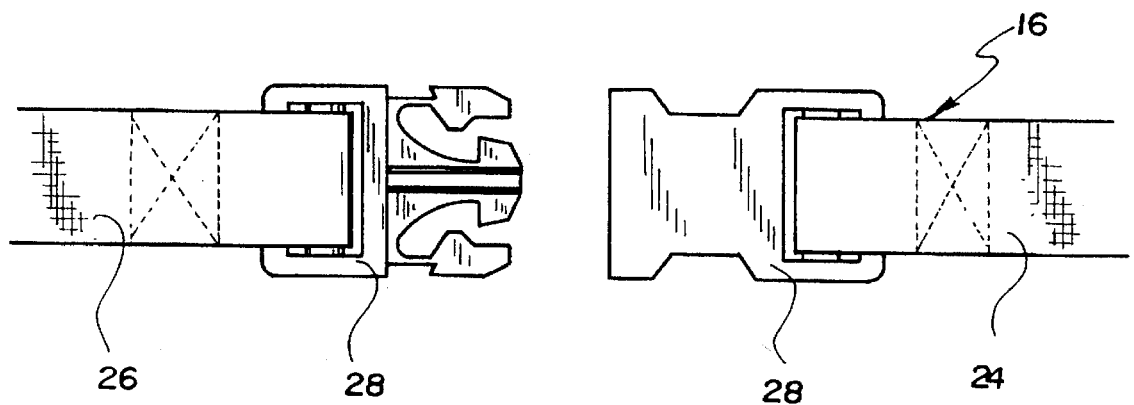
FIG. 5 is an exploded elevational view of the area set forth in FIG. 1.

With reference now to the drawings, and in particular to FIGS. 1–6 thereof, a new operator seat harness embodying the principles and concepts of the present invention and generally designated by the reference numeral 10 will be described.

More specifically, it will be noted that the operator seat harness 10 comprises at least one and preferably a pair of torso straps which can be secured to opposed sides of a back 12 of an operator's seat 14, substantially as shown in FIGS. 1 and 2 of the drawings. The torso straps include upper and lower torso straps 16 and 18 extending in a substantially spaced and parallel orientation relative to one another. A pair of should straps including a left shoulder strap 20 and a right shoulder strap 22 are coupled to the torso straps 16 and 18 and extend upwardly therefrom for coupling to an upper end of the back 12 of the seat 14. By this structure, an individual or operator residing within the operator's seat 14 can be secured relative to the seat during movement of an associated vehicle or machine such as a crane into tilted or inclined orientations to reduce operator fatigue and increase comfort.

With continuing reference to FIGS. 1 and 2, it can be shown that the upper torso strap 16 comprises a left upper torso strap 24 and a right upper torso strap 26 which are removably coupled together by an upper torso buckle 28. Similarly, the lower torso strap 18 comprises a left lower torso strap 30 and a right lower torso strap 32 which are removably coupled together by a lower torso buckle 34. Thus, as shown in FIG. 5 for the upper torso strap 16, the torso straps 16 and 18 can be separated to allow an operator to be positioned therebetween with the straps being subsequently securable about the operator to secure the same relative to the seat 14.

Figure 6:
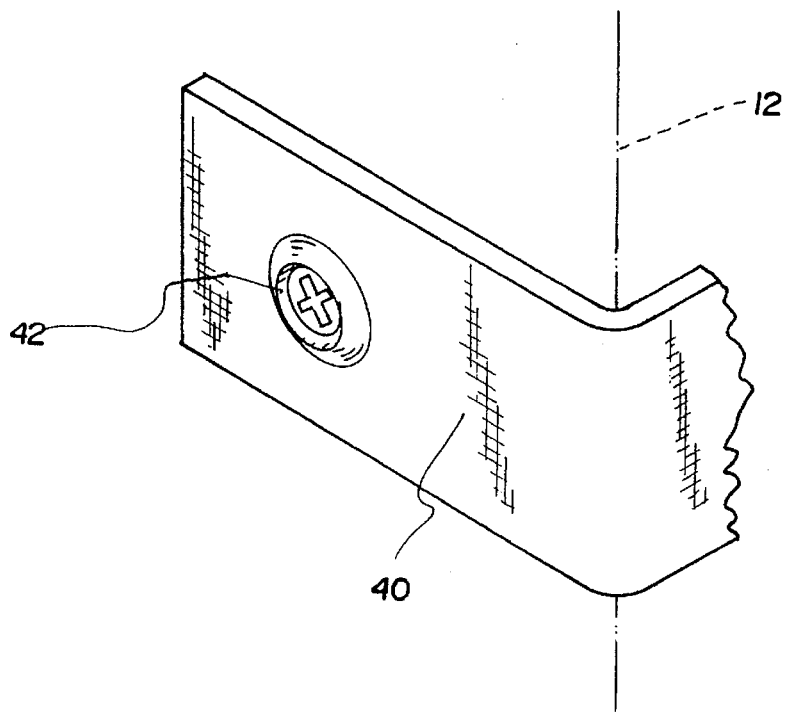
FIG. 6 is an isometric illustration of the area set forth in FIG. 2.

As shown in FIG. 2, the torso straps 16, 18 and the shoulder straps 20, 22 each include an anchor portion 40 which can be secured to the back 12 of the seat 14 to secure the device 10 thereto. FIG. 6 illustrates one possible manner in which the anchor portions 40 can be secured to the back 12 of the seat 14. To this end, an anchor fastener 42 is directed through the anchor portion 40 and into the seat back 12. The anchor fastener 42 may be a threaded fastener, as shown in the drawings.

As shown in FIGS. 2 and 3, the left and right shoulder straps 20 and 22 include left and right shoulder buckles 36 and 38 which permit at least a portion of the shoulder straps 20 and 22 to be selectively decoupled from the seat 14 when the straps are secured thereto. To secure the shoulder straps 20 and 22 together at a fixed distance apart, a chest strap 44 can extend between the shoulder straps, as shown in FIG. 1. The chest strap 44 serves to engage a chest of an operator and maintain the shoulder straps in a parallel orientation as the operator is forced against the straps during use of the invention 10.

Referring now to FIG. 4 with concurrent reference to FIG. 1, it can be shown that the preferred movable coupling between the shoulder straps 20, 22 and the torso straps 16, 18 can be accomplished by providing mounting straps 46 which are secured to the respective shoulder straps 20 or 22 and extend over a respective one of the torso straps 16 or 18. More specifically, each of the mounting straps 46 is secured at opposed ends thereof to a portion of the respective shoulder strap 20, 22, with the respective torso strap 24, 26, 30, or 32 extending between the mounting strap 46 and the shoulder strap to movably couple the shoulder strap thereto. As shown in the lower portion of FIG. 4, the lower end of the respective shoulder strap 20 or 22 can be folded onto and secured to itself to form the lowermost mounting strap 46 on each respective shoulder strap. By this structure, lower portions of the shoulder straps are permitted to be slidably positioned along the torso straps into a non-parallel orientation to accommodate a larger torso portion of an operator, while upper portions of the shoulder straps are maintained in a parallel orientation by the chest strap 44.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An operator seat harness for use in association with an operator's seat, the apparatus comprising, in combination:
   an operator's seat having a back;
   an upper torso strap secured to opposed sides of the back of the seat;
   a lower torso strap secured to opposed sides of the back of the seat;

a pair of shoulder straps including a left shoulder strap and a right shoulder strap, the shoulder straps being movably coupled to the torso straps, and extending upwardly therefrom and coupled to an upper end of the back of the seat;

wherein the upper torso strap comprises a left upper torso strap and a right upper torso strap, with an upper torso buckle being coupled to the left upper torso strap and the right upper torso strap for removably coupling the torso straps together;

wherein the lower torso strap comprises a left lower torso strap and a right lower torso strap, a lower torso buckle removably coupling the torso straps together;

wherein the left and right shoulder straps including left and right shoulder buckles which permit at least a portion of the shoulder straps to be selectively decoupled from the seat when the straps are secured thereto;

a chest strap extending between the shoulder straps to secure the shoulder straps together at a fixed distance apart so as to maintain the shoulder straps in a parallel orientation;

a plurality of mounting straps secured at opposed ends thereof to a portion of the respective shoulder straps and extending over a respective one of the upper and lower torso straps so as to movably couple the shoulder straps thereto.

\* \* \* \* \*